T. E. COSTELLO.
Painters' Pots.
No. 137,423.  Patented April 1, 1873.
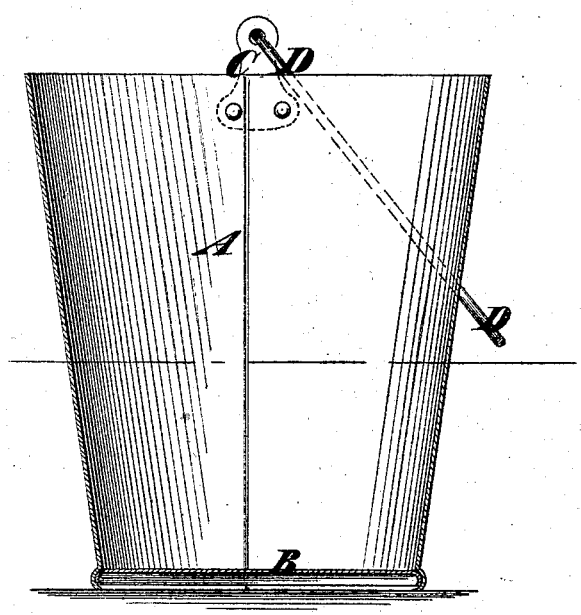
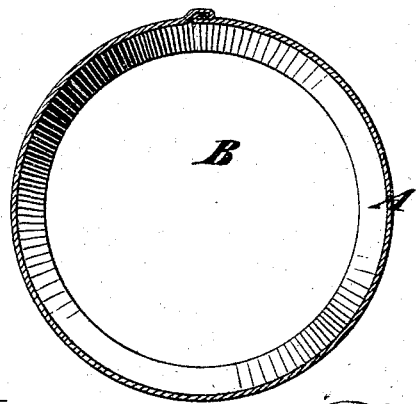

UNITED STATES PATENT OFFICE.

THOMAS E. COSTELLO, OF BROOKLYN, NEW YORK.

IMPROVEMENT IN PAINTERS' POTS.

Specification forming part of Letters Patent No. 137,423, dated April 1, 1873; application filed March 10, 1873.

*To all whom it may concern:*

Be it known that I, THOMAS E. COSTELLO, of Brooklyn, in the county of Kings and State of New York, have invented an Improved Painter's Pot, of which the following is a specification:

This invention consists in a painter's pot having a sharp edge and made tapering from the mouth downward, and constructed wholly without solder. The sharp edge affords a convenient and ever-handy substitute for the knife ordinarily used to remove paint from the brush after use, and, together with the taper contour of the pot, obviates the dribbling of paint from the brush when laid across the mouth of the pot, down the outside of the pot. The joints of the pot being destitute of the solder, I am enabled to burn out what paint may remain in it after use, and the taper form much facilitates the scraping out of the pot to remove any flakes or particles of paint which may still adhere to it. Moreover, the taper form of the pot enables a muslin strainer to be attached very securely.

In the accompanying drawing, Figure 1 is a vertical section of a pot made according to my invention, and Fig. 2 is a horizontal section of the same.

Similar letters of reference indicate corresponding parts in both figures.

The body A of the pot is made tapering from the mouth downward, as represented, and its joint is of the kind known as a double-lap joint. The bottom B is united to it by creasing together the contiguous edges of both. The lugs C C, to which the handle D is fastened, are secured to the pot by rivets.

After painting, there always remains some paint in the brush, and it is impossible to remove this by the ordinary beaded edges commonly made on painters' pots without the assistance of a knife. By forming a sharp edge on the pot, I provide for the knife an ever-handy substitute. After use, paint adheres and dries inside the pot, and it is only with difficulty removed; but, by making the pot without solder, I am enabled to make a fire within it, and thereby blister off the paint adhering to it. Afterward the pot may be scraped out by a knife, and this is rendered easy by the taper form of the pot. Another advantage resulting from the taper form of the pot is that a muslin strainer may be attached to it much more securely than when the pot is cylindrical, for, on any tendency of the strainer to draw off the pot, the cord securing it is drawn up on the larger portion, and is tightened on the edges of the strainer.

I claim—

As a new article of manufacture, a painter's pot having a sharp edge at the mouth and made tapering from it to the bottom, and constructed wholly without solder, substantially as and for the purpose herein set forth.

THOS. E. COSTELLO.

Witnesses:
MICHAEL RYAN,
FRED. HAYNES.